United States Patent
Fletcher

(10) Patent No.: US 6,571,292 B1
(45) Date of Patent: *May 27, 2003

(54) INTEGRATION OF STRUCTURED DOCUMENT CONTENT WITH LEGACY 3270 APPLICATIONS

(75) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,847

(22) Filed: Dec. 17, 1999

(51) Int. Cl.[7] .............................................. G06F 15/16

(52) U.S. Cl. ........................ 709/231; 709/236; 709/202

(58) Field of Search ................................ 709/230, 231, 709/219, 227, 202

(56) References Cited

U.S. PATENT DOCUMENTS

| | | | | | |
|---|---|---|---|---|---|
| 5,754,830 A | * | 5/1998 | Butts et al. | ................. | 709/311 |
| 6,067,579 A | * | 5/2000 | Hardman et al. | ........... | 709/328 |
| 6,216,164 B1 | * | 4/2001 | Zaremba, Jr. | ................ | 709/227 |
| 6,327,624 B1 | * | 12/2001 | Mathewson et al. | ........ | 709/231 |
| 6,480,895 B1 | * | 11/2002 | Gray et al. | .................. | 709/231 |

OTHER PUBLICATIONS

Luther Bonnet, SNA Fundamentals, Text vol. 1, Science Research Associates, Inc. 1987.*

IBM Technical Disclosure Bulletin, "Detecting End of Host Print Job With End-of-Life", vol. 32, Issue 11, pp. 137–138.*

IBM Technical Disclosure Bulletin, "Host-to-Host File Transfer via 3270 Terminal Emulator", vol. 39, Issue 7, pp. 91–92.*

IBM Technical Disclosure Bulletin, "Detecting End of Host Print Job with End-of-File", vol. 32, Issue 11, pp. 137–138.*

* cited by examiner

Primary Examiner—Mark Powell
Assistant Examiner—Douglas B Blair
(74) Attorney, Agent, or Firm—Jeanine S. Ray-Yarletts; Marcia L. Doubet

(57) ABSTRACT

A method, system, and computer program product for integrating structured document content, such as XML (Extensible Markup Language) content, in a 3270 data stream structured field. The 3270 data stream structured fields, including the structured document content so embedded, are passed between a primary logical unit and a secondary logical unit that communicate with each other over a network using 3270 data stream architecture. An initialization protocol sends a Read Partition (Query) structured field from the primary logical unit to the secondary logical unit, to query whether the secondary logical unit supports structured document content. The secondary logical unit sends a Query Reply structured field to the primary logical unit in response to receipt of the Read Partition (Query) from the primary logical unit if the secondary logical unit supports structured document content. In response to receipt of the Query Reply structured field from the secondary logical unit, the 3270 data stream structured field including the embedded document content is passed between the primary logical unit and the secondary logical unit. Spanning (and caching) may be used to send document content that exceeds structured field length limits. Accordingly, structured documents encoded in XML and other markup languages may be integrated with legacy 3270 applications, without requiring the rewriting of legacy applications, and allowing the use of the highly developed 3270 data stream architecture.

45 Claims, 14 Drawing Sheets

*100*

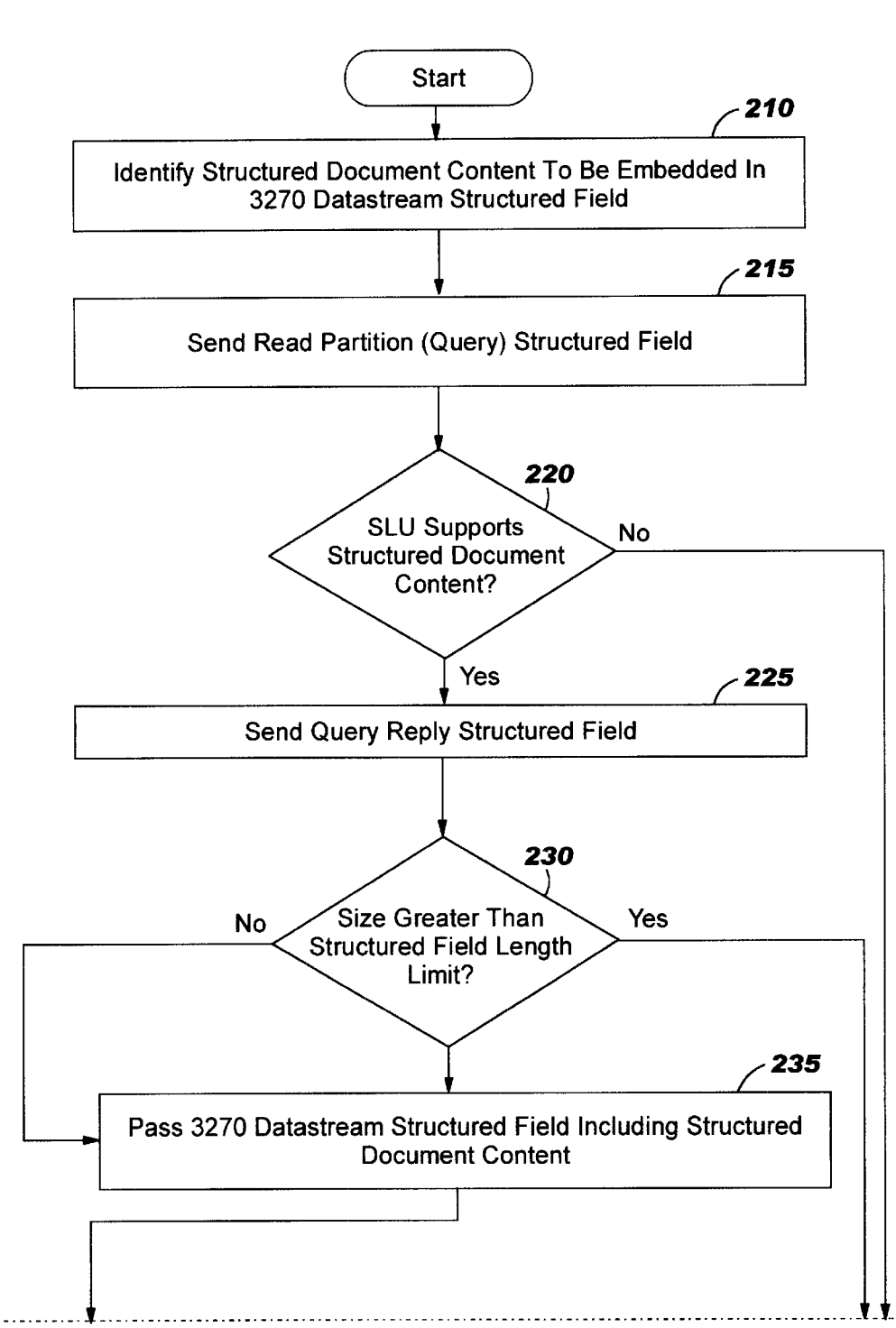

FIG. 3A

| Structured Document Content Type | Identifier | Content Processor |
|---|---|---|
| XML | X | XML processor |
| MathML | Y | MathML processor |
| WBXML | Z | WBXML processor |
| ... | | |

350 — Structured Document Content Type
355 — Identifier
360 — Content Processor
365 — XML row
370 — MathML row
375 — WBXML row
380 — ...

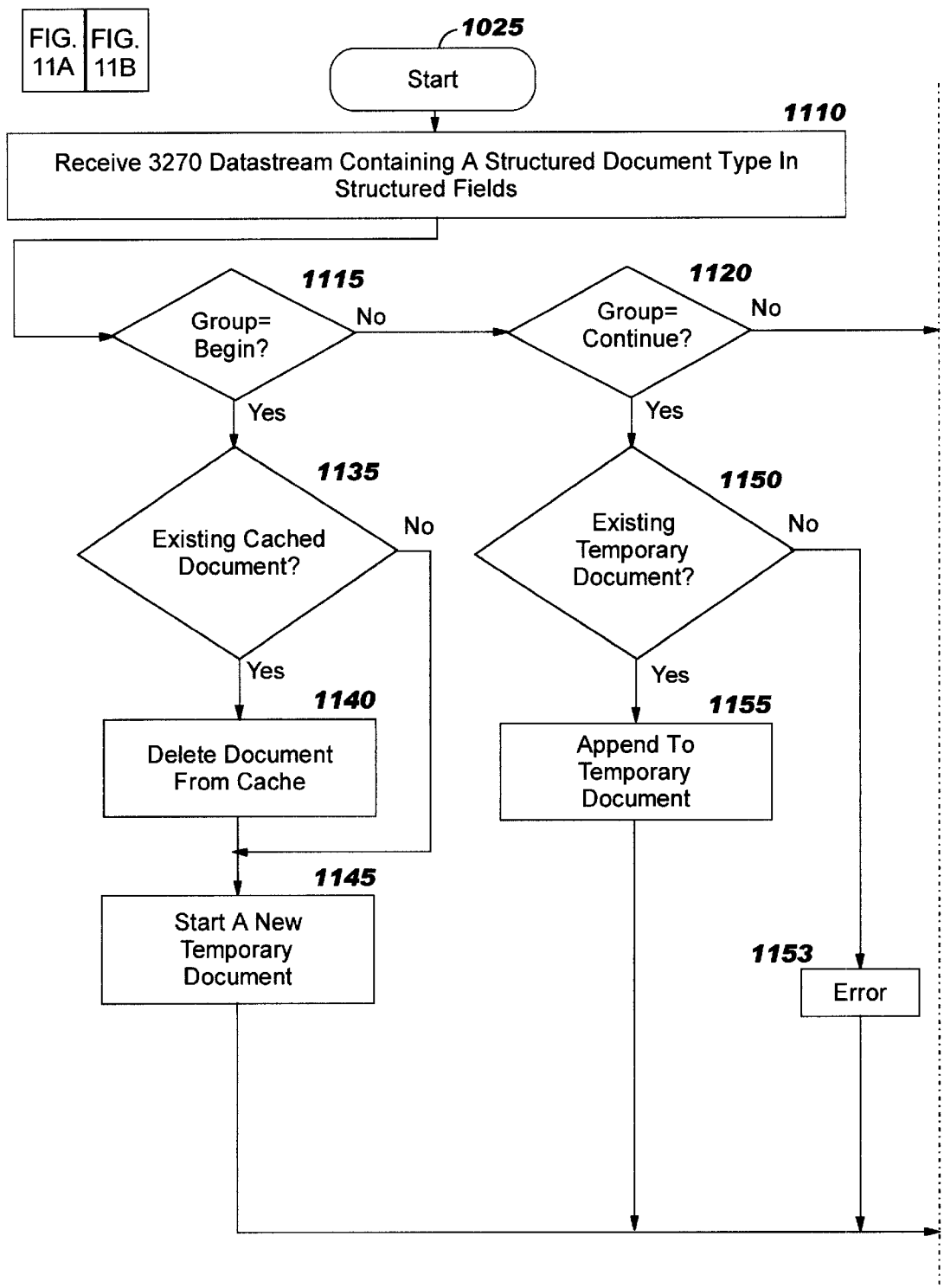

INTEGRATION OF STRUCTURED DOCUMENT CONTENT WITH LEGACY 3270 APPLICATIONS

RELATED INVENTION

This application is related to application Ser. No. 09/465,909, filed concurrently herewith, entitled "Communication of Structured Document Content Between 3270 Logical Units", assigned to the assignee of the present invention, the disclosure of which is hereby incorporated herein by reference.

BACKGROUND OF THE INVENTION

1. Field of the Invention

The present invention relates to the field of computer programming, and more particularly to a system, method, and computer program product for integrating structured document content (such as content created in the Extensible Markup Language, or "XML") with legacy 3270 applications.

2. Description of the Related Art

One of the challenges facing information services professionals today is the difficulty of bridging legacy mainframe host data to modern applications and their PC-based user interfaces. Most legacy host applications present their data in text-based user interfaces designed for use on specific, obsolete character-based terminals. The legacy applications were written with this character-based terminal presentation space as the only interface format in which the host data output is created, and in which host data input is expected. ("Presentation space" is a term used abstractly to refer to the collection of information that together comprises the information to be displayed on a screen, as well as the control data that conveys how and where that information is to represented.)

A typical character-based terminal is the IBM Model 3270. (IBM is a registered trademark of the International Business Machines Corporation.) This terminal model was designed to display information in a matrix of characters, where the matrix consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" consists of a limited number of presentation attributes such as what color to use when displaying that text, the color of the background, etc. While the Model 3270 is a specific type of IBM display hardware, data formatted for any display having similar characteristics became a de facto standard format referred to as a "3270 data stream".

Data processing systems, methods, and computer program products that use the 3270 data stream architecture have been widely used for decades. The 3270 data stream architecture has been so widely used that systems and applications using the 3270 data stream architecture are often referred to as "legacy" systems and "legacy" applications.

The 3270 data stream architecture is used to communicate between a primary logical unit and a secondary logical unit using the LU2 protocol. The primary and secondary logical units may be mainframe computers, midrange computers, personal computers, terminals, workstations, or one or more computer programs that execute on one or more of the these devices. The 3270 data stream architecture is described in many publications, including "IBM 3270 Information Display System Data stream Programmer's Reference", IBM Publication Number GA23-0059-07 (1992), which is hereby incorporated herein by reference.

As shown in FIG. 1, a data processing system 100 includes a primary logical unit 110 and a secondary logical unit 120 that communicate with each other over a network 130 using the 3270 data stream. The primary logical unit 110 may also be referred to as a host or server, and the secondary logical unit 120 may be referred to as a terminal, workstation, emulator, or client. As will be obvious to one of skill in the art, although FIG. 1 illustrates a simple data processing system 100 including one primary logical unit, one secondary logical unit 120, and a simple network connection 130, the 3270 data stream architecture is generally used to communicate among many primary logical units and secondary logical units using complex network environments. An example of a more typical data processing system using 3270 data stream architecture may be found in U.S. Pat. No. 5,649,101, entitled "System and Method for Improving 3270 Data Stream Performance by Reducing Transmission Traffic", the disclosure of which is hereby incorporated herein by reference.

The 3270 data stream architecture was designed well before many of the recent advances in computing, such as the definition of markup languages including XML for representing structured document content. XML is a standardized formatting notation, created for structured document interchange on the World Wide Web (hereinafter, "Web"). XML is a tag language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends.

The syntax of XML is extensible, providing users the capability to define their own tags. XML is based on the Standard Generalized Markup Language ("SGML"), which is an international standard for specifying document structure. XML is a simplified version of SGML, tailored to Web document content. (Refer to ISO 8879, "Standard Generalized Markup Language (SGML)", (1986) for more information on SGML. Refer to "Extensible Markup Language (XML), W3C Recommendation Feb. 10, 1998" which is available on the World Wide Web at http://www.w3.org/TR/1998/REC-xml-19980210, for more information on XML.)

XML is widely accepted in the computer industry for defining the semantics (that is, by specifying meaningful tags) and content of the data encoded in a file. The extensible, user-defined tags enable the user to easily define a data model, which may change from one file to another. When an application generates the tags (and corresponding data) for a file according to a particular data model and transmits that file to another application that also understands this data model, the XML notation functions as a conduit, enabling a smooth transfer of information from one application to the other. By parsing the tags of the data model from the received file, the receiving application can re-create the information for rendering (i.e. display, printing, or other processing, as the generating application intended it).

Other popular markup languages include the HyperText Markup Language ("HTML"), Wireless Application Protocol Binary XML ("WBXML"), MathML, and VoiceXML. Each of these languages is adapted for the needs of a particular environment. HTML, for example, is adapted for general use with documents in the Web environment, and WBXML is adapted for document presentation on wireless computing devices.

It is anticipated that the interchange of documents created using a markup language will continue to increase in popularity as distributed computing becomes more pervasive in society. It would be desirable to rewrite legacy applications to receive and deliver data using the structured format defined by these modern markup languages, in order to make the application's functionality available to users having a wide spectrum of computing device types. However, for most companies the rewrite of legacy applications represents a monumental task. Not only are there literally millions of lines of code to rewrite, but the skills that are required to program host applications (ability to use the COBOL programming language, for example) are in short supply. Furthermore, modification of existing legacy application software to change the data format used is very likely to introduce new errors, necessitating a significant testing and debugging effort.

Thus, it would be desirable to provide a technique for integrating structured document content with legacy 3270 applications to obtain the advantages of using the same existing conduit that transports the 3270 legacy data to transport the structured document content, and of using existing document processors which operate upon documents created in the various markup languages. These existing document processors include parsers and rendering software, which process a structured document for display or other presentation to a user; applications that have been written to process the content which can be extracted from a structured document; style sheet processors; etc. (A "style sheet" is a specification of a style that is to be used when presenting a document. The style specification includes information such as the font and margins to be used, the formatting layout, and other types of information that indicate how the presented document should appear. Style sheets can be used for many types of presentation of a document, including printing the document, displaying it on a video display, processing the document by a speech synthesizer, etc. Style sheets may also be utilized to describe transformations from one document type to another, e.g. from MathML to HTML, or as filters which describe transformations to reduce the amount of content while maintaining the original document type.)

Preferably, this integration of structured document content with legacy 3270 applications will not require rewriting or significantly modifying existing legacy applications.

Techniques exist that might be used for transforming legacy application data from the 3270 data stream into structured document content, for example by transforming the data stream with a specially-written transformation engine at the server on which the legacy application is executing, and then sending this transformed data to the application client. However, this approach fails to take advantage of the existing infrastructure for transporting 3270 data streams. Alternatively, the 3270 data stream can be transformed using a transformation engine at an intermediary point within the network such as a gateway. Both of these approaches suffer from the disadvantage that the existing client application software, written to process 3270 data streams, must then be replaced with application software written to process the structured document format. Furthermore, the latter approach introduces significant complexity in generating an appropriate 3270 data stream for forwarding client-generated messages back to the legacy application executing on the server—in effect, simply moving the problem from one location to another. While replacing the client software may be a desirable long-term goal, providing an integration of structured document content with existing 3270 data streams enables existing software to continue to function, but with potentially significant new value—and makes a phased-in approach to modifying the client software possible.

Accordingly, what is needed is a technique for integrating structured document content with legacy 3270 applications to obtain the advantages of structured document exchange in legacy systems while avoiding the shortcomings of existing transformation techniques.

SUMMARY OF THE INVENTION

It is an object of the present invention to provide a technique that enables integration of structured data content within 3270 data stream traffic.

It is yet another object of the present invention to provide this technique in a manner that does not require, or at least minimizes, change to existing legacy application programs.

To achieve the foregoing objects, and in accordance with the purpose of the invention as broadly described herein, the present invention provides a method, system, and computer program product for integrating structured document content, such as XML (Extensible Markup Language) content, in a 3270 data stream structured field. The 3270 data stream structured fields, including the structured document content so embedded, are passed between a primary logical unit and a secondary logical unit that communicate with each other over a network using 3270 data stream architecture. An initialization protocol sends a Read Partition (Query) a structured field from the primary logical unit to the secondary logical unit, to query whether the secondary logical unit supports structured document content. The secondary logical unit sends a Query Reply structured field to the primary logical unit in response to receipt of the Read Partition (Query) from the primary logical unit if the secondary logical unit supports structured document content. In response to receipt of the Query Reply structured field from the secondary logical unit, the 3270 data stream structured field including the embedded document content is passed between the primary logical unit and the secondary logical unit. Spanning (and caching) may be used to send document content that exceeds structured field length limits. Accordingly, structured documents encoded in XML and other markup languages may be integrated with legacy 3270 applications, without requiring the rewriting of legacy applications, and allowing the use of the highly developed 3270 data stream architecture.

The present invention will now be described with reference to the following drawings, in which like reference numbers denote the same element throughout.

BRIEF DESCRIPTION OF THE DRAWINGS

FIG 2. shows organization of FIGS. 2A–2B.

FIGS. 2A–2B are flowcharts illustrating overall operations for passing structured document content according to the present invention;

FIG. 3A is a table illustrating the relationship between a defined document content type, a structured document content type identifier that appears in a 3270 data stream structured field according to the present invention, and a content processor corresponding to each specific content type;

FIG. 11 shows organization of FIGS. 11A–11B.

FIGS. 11A–11B are flowcharts illustrating operations performed at a client to receive and cache spanned documents according to a preferred embodiment of the present invention.

DESCRIPTION OF THE PREFERRED EMBODIMENT

Figure 1:
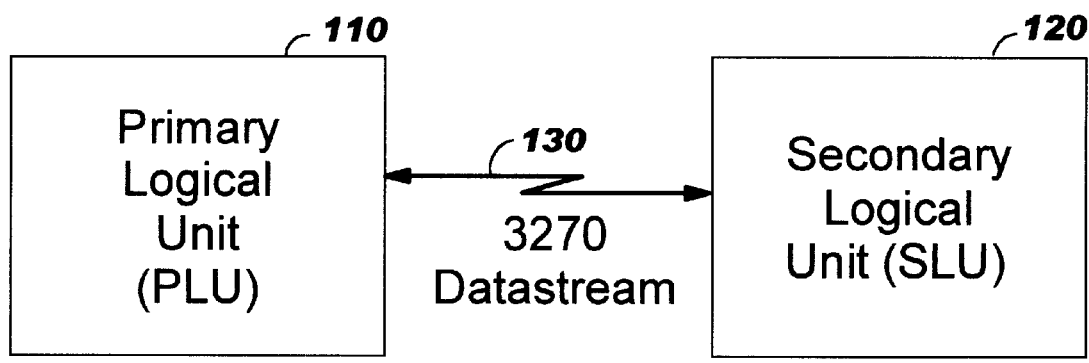
FIG. 1 is a simplified block diagram of a conventional data processing system using 3270 data stream communication.

The present invention defines a technique for embedding structured document content in a 3270 data stream structured field and passing the 3270 data stream structured field, including the structured document content so embedded, between a primary logical unit ("PLU") and a secondary logical unit ("SLU") that communicate with each other over a network using 3270 data stream architecture. The 3270 data stream structured fields are well known elements of the 3270 data stream architecture that are used to send and receive additional control functions and data. The benefits of existing document processors which process structured document content may then be made available to users of the legacy applications. Moreover, the structured document content is transported through the same conduit that transports the 3270 legacy data. Thus, new infrastructure need not be developed, and existing management projects, procedures, and tools may be used. The structured document content may thereby be integrated with legacy applications, both temporally and spatially. Incremental replacement of legacy application data with new structured document content, and of legacy application software with new software adapted to use with structured document content, may be provided through use of the present invention.

Prior to passing the 3270 data stream structured field (including structured document content embedded therein) between the PLU and SLU, the sender of the structured document will preferably ensure that the receiver supports this type of document content. According to the present invention, an initialization protocol sends a Read Partition (Query) structured field from the PLU to the SLU, to query whether the SLU supports structured document content. The SLU then replies to the PLU with a Query Reply structured field if the SLU supports structured document content. In response to receipt of the Query Reply structured field from the SLU, the 3270 data stream structured field including embedded structured document content may then be passed between the PLU and the SLU.

The host application may send structured data content to the SLU in either an unsolicited manner, or in response to a document request from the SLU.

U.S. Pat. No. 6,480,895, titled "Integration of Objects Including Java Bytecodes With Legacy 3270 Applications", defines a technique for integrating Java bytecodes and objects to be used with Java applets in a 3270 data stream. However, this patent does not address integration of structured document content into a 3270 data stream. U.S. Pat. No. 6,327,624, titled "Communication of Objects Including Java Bytecodes Between Logical Units Including Java Virtual Machines", defines a technique for transmitting Java bytecodes and objects to be used with Java applets between logical units using a 3270 data stream. This patent also does not address structured document content.

In the preferred embodiment of the present invention, the structured document content that is embedded in a 3270 data stream structured field may be encoded in a number of alternative markup languages. Alternatively, an implementation of the present invention may support only a single markup language, such as XML, without deviating from the inventive concepts disclosed herein. When multiple markup languages are supported, it is necessary to identify the document type of the document that is embedded at a particular point in a data stream. Thus, a document type identifier is preferably included in the data stream along with (and preceding the actual content of) the structured document. By identifying the document type, the structured field type indirectly indicates the type of content processor that can process the structured document (as will be described below with reference to FIG. 3A).

Note that while structured documents typically identify the markup language in which they are encoded by information within the document header, structured documents may frequently be longer than the outbound data length for which 3270 data stream architecture was originally designed and optimized. In particular, a 3270 structured field can include a maximum of 32 kilobytes of data. To transmit structured documents which exceed this length, a 3270 data stream technique called "spanning" may optionally be used in an implementation of the present invention. This spanning technique uses multiple structured fields (as will be described in detail herein), as required to transmit the entire structured document. Thus, when the document is split into segments or chunks for transmission using spanning, the document header is only available in the first such chunk to be transmitted. By including an explicit content type identifier within each chunk, the receiver is able to independently determine the type of each chunk of the message.

When spanning is implemented, the spanned 3270 data stream structured fields may optionally be cached in the SLU until the entire document has been received. More specifically, in a conventional 3270 application, there are often long pauses between data inputs by the user. Spanned chunks of 3270 data stream structured fields with segments of structured documents embedded therein may be interleaved with the other transmissions in the session, such as character-formatted data sent by the legacy application. The structured fields for structured document content may optionally include a "Process Now" indicator that can be turned on or off. Thus, an application may start sending structured data in advance of it being needed at the receiver. The data may then be cached in the SLU, so that the structured document can be rendered to the user (or otherwise processed) without a perceptible pause that might otherwise occur if the entire document had not yet been received. Optionally, support for initiating the document processing on command may be provided, wherein when the structured document is to be rendered or otherwise processed (e.g. when the last spanned chunk has been sent), another structured field may be sent referencing the previously sent document by name with a "Process Now" indicator turned on.

As a technique to reduce the quantity of data being sent between a host and a client, an implementation of the present invention may optionally include support for a "process by name" syntax by which the host instructs the client to render or otherwise process a specific structured document without actually sending the document. This technique may also be used to request processing of a document that was sent with the "Process Now" flag set off. If the client already has the document cached from a previous use, the client can render (or otherwise process) the document from the cache. Otherwise, when the document is not already in the client's cache, the client requests the missing document from the host, which supplies it by sending the document in 3270 data stream structured fields. Once the client receives and caches the document, or retrieves it from a cache, the client processes the document in a similar manner as if the host had sent the document directly rather than sending the process by name message.

Accordingly, structured document content may be integrated with legacy 3270 applications, without requiring the rewriting of legacy applications and allowing the use of highly developed 3270 data stream architecture. Initialization protocols, caching, and spanning of integrated structured document content are also provided by the present invention.

As will be appreciated by one of skill in the art, the present invention may be embodied as methods, systems (apparatus), or computer program products. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of a preferred embodiment of the present invention are illustrated in detail in FIGS. 2, 3B, and 8 through 12 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as was described in FIGS. 2, 3B, and 8 through 12, or by combinations of special purpose hardware and computer instructions.

A preferred embodiment of the present invention will now be described with reference to FIGS. 2 through 12.

Figure 2B:
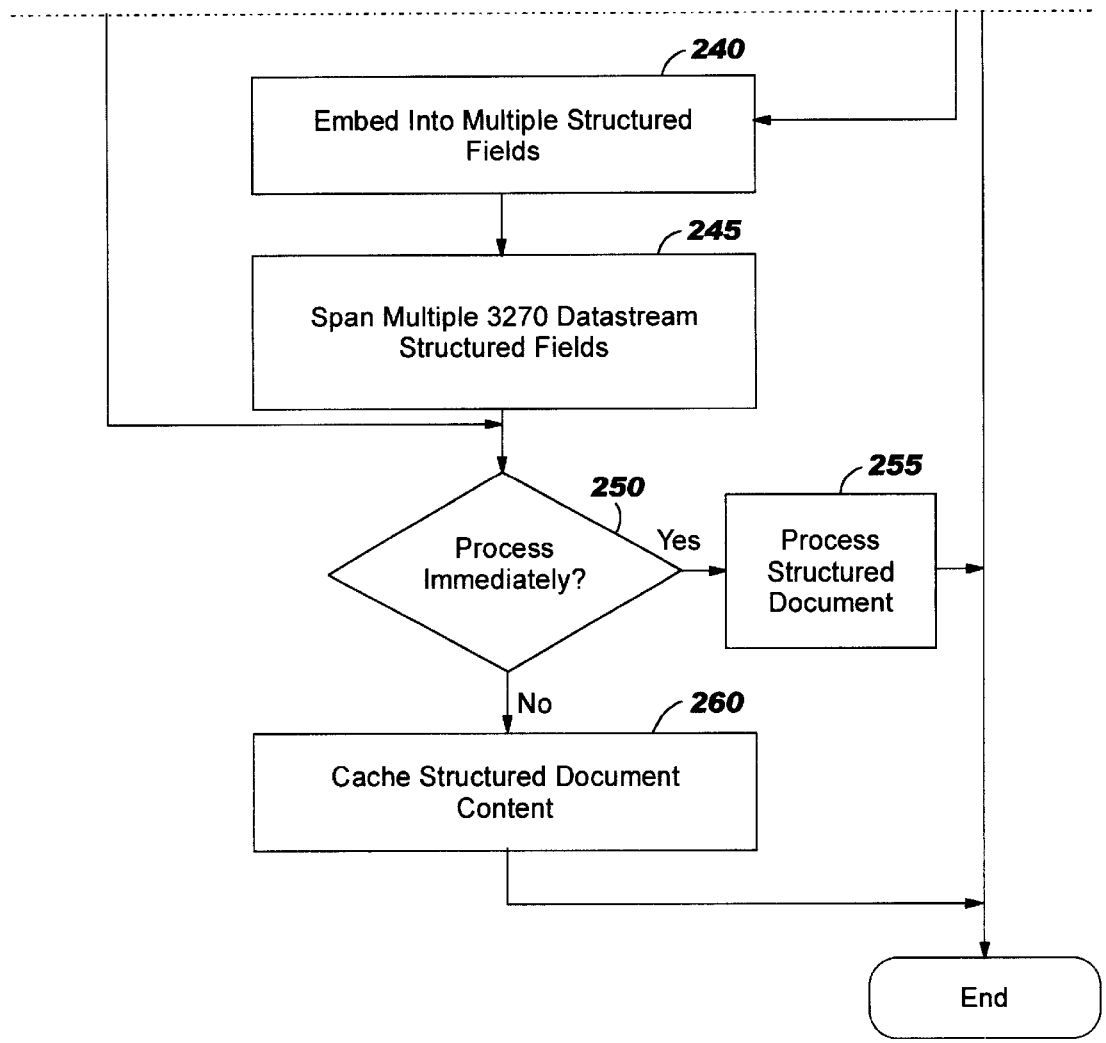
Figure 8:
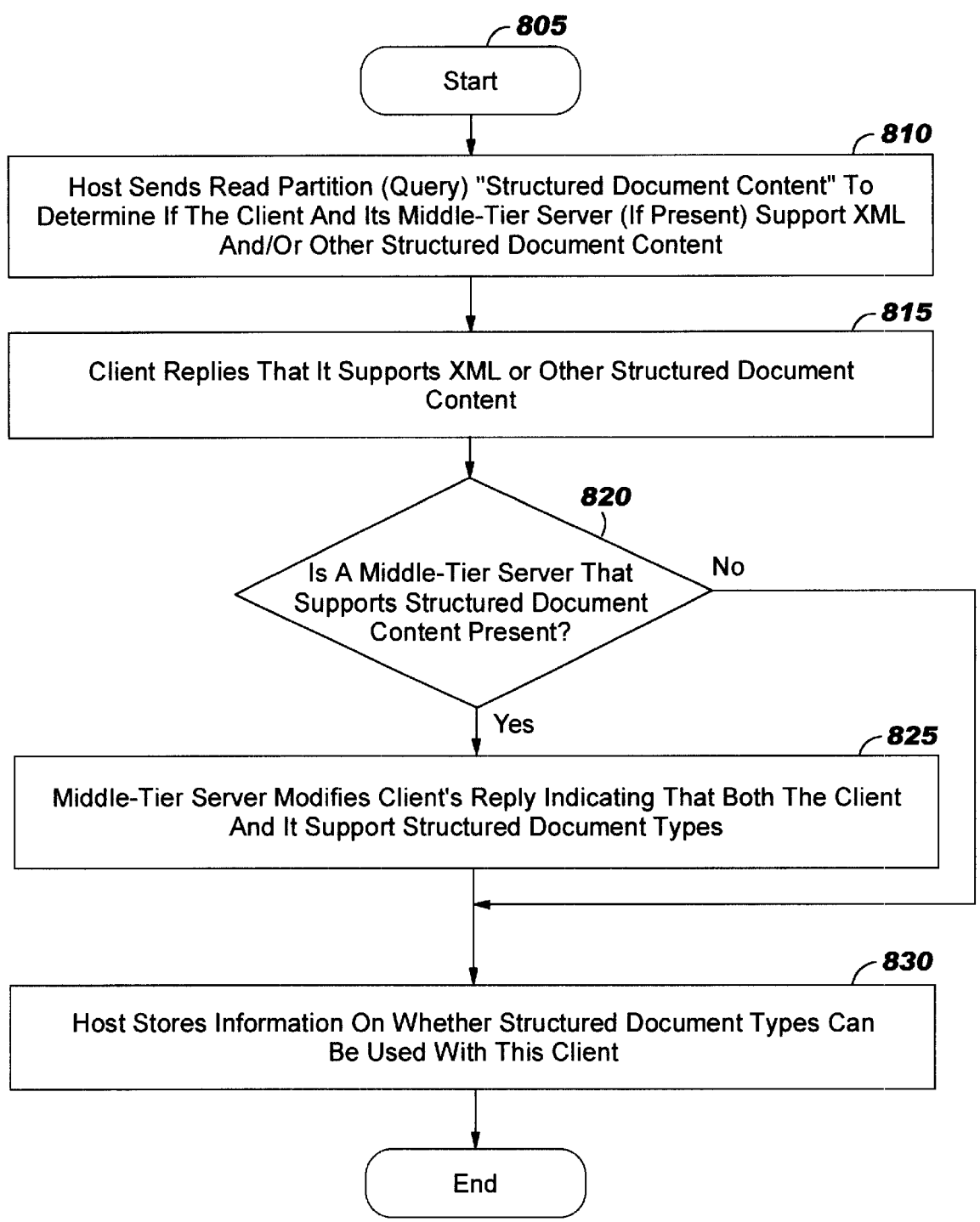
FIG. 8 illustrates initialization logic by which a host can determine whether it may send structured document content to a client, according to a preferred embodiment of the present invention.

FIG. 2 is a flowchart illustrating overall operations for passing structured document content between a PLU 110 and an SLU 120 that communicate with each other over a network 130 using 3270 data stream architecture, as was described in connection with FIG. 1. Referring now to FIG. 2, at Block 210, an identification is made of the structured document content that is to be embedded in 3270 data stream structured fields. (This processing is described in more detail below with reference to FIG. 3B.) Modification of conventional structured fields to accept embedded structured document content will be described in detail below. At Block 215, initialization is performed by sending a Read Partition (Query) structured field from the PLU to the SLU, to query whether the SLU supports structured document content. An example of a Read Partition (Query) structured field which is used in the preferred embodiment for this purpose is described below. FIG. 8 illustrates a specific embodiment of Blocks 215 and 220, as will be described below.

At Block 220, it is determined whether the SLU supports structured document content. If not, the PLU cannot send the structured document content to the SLU, and operations end. If Block 220 has a positive result, however, then at Block 225 a Query Reply structured field is sent from the SLU to the PLU. An example of a Query Reply structured field which is used in the preferred embodiment for this purpose is provided below.

At Block 230, a determination is made as to whether the size of the structured document content to be transmitted is greater than the length limit of 3270 structured fields (32 kilobytes). If not, then control transfers to Block 235 where the 3270 data stream structured field including structured document content is then passed between the PLU and the SLU. As is described in detail below, the 3270 data stream structured field including embedded structured document content can be pushed from the PLU to the SLU under control of the PLU, without receiving a request for the document content from the SLU. Control then transfers to Block 250.

Figure 9:
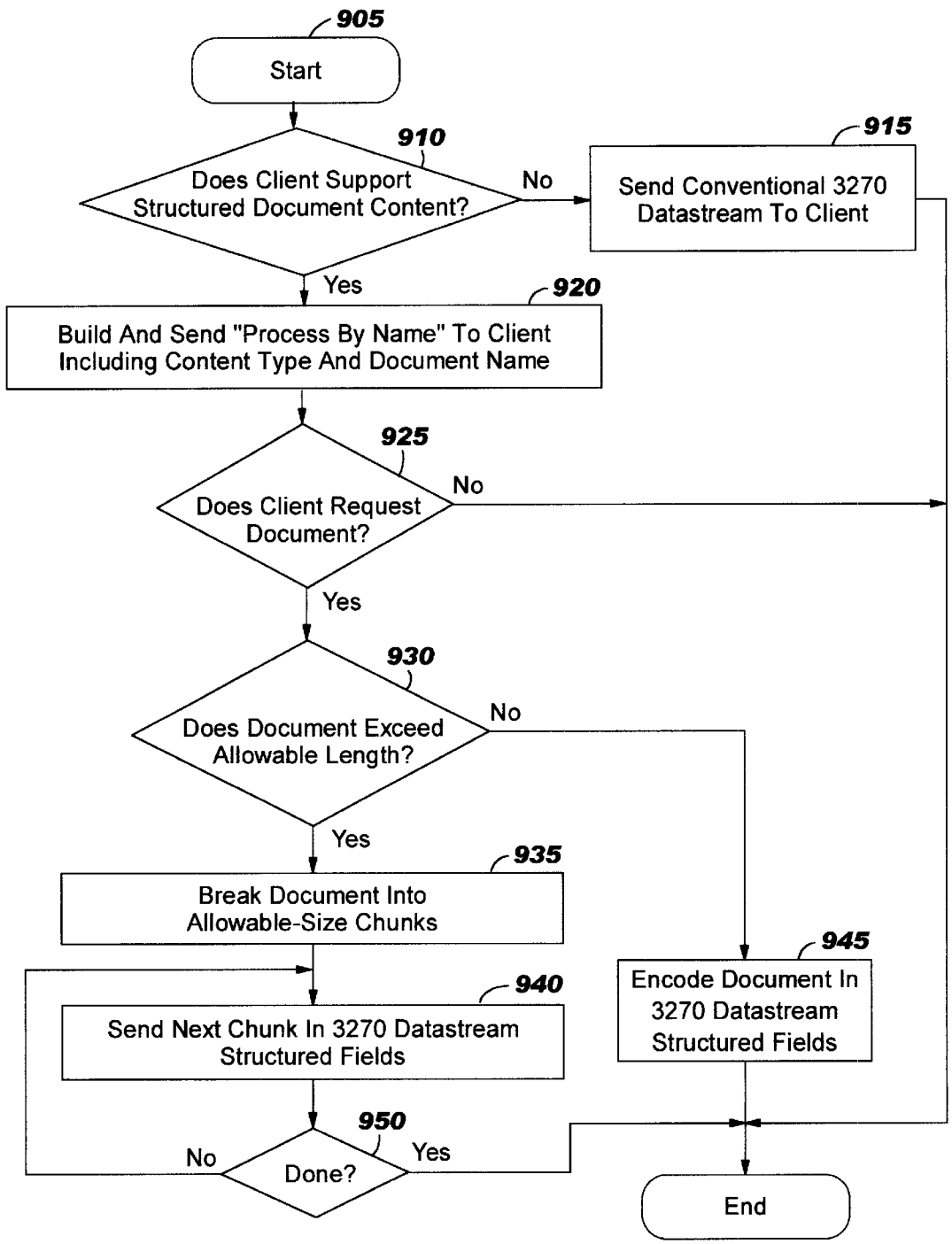
FIG. 9 illustrates logic performed by a host when it desires to send structured document content to a client, according to a preferred embodiment of the present invention.

If the document content to be transmitted exceeds the 3270 structured field length limit (i.e. a positive result at Block 230), then at Block 240, the structured document content is embedded into multiple 3270 data stream structured fields. Then, at Block 245, the technique of spanning is used to pass multiple 3270 data stream structured fields including embedded structured document content between the PLU and the SLU. FIG. 9 illustrates in more detail the operations of Block 240 and 245, showing a specific embodiment of spanning that may be used with the present invention, as will be described below.

A structured document exceeding the structured field length may be spanned from the PLU to the SLU before it is actually needed for processing. Furthermore, a document that is not spanned may also be sent to the SLU before it is to be processed. In these cases, the 3270 data stream structured field(s) used to transmit the document may be cached in the SLU. Accordingly, at Block 250, a test may be made by the client as to whether the structured document which it has received should be rendered or otherwise processed now. It will be understood by those having skill in the art that the term "render" is used herein to encompass processing appropriate to the particular document type which was transmitted. To enable this processing, the 3270 data stream structured fields include an optional indicator that inhibits processing of the document. (Support for this indicator is an optional aspect of the present invention. When this support is not implemented, the document will preferably be processed immediately upon receipt, or as needed by the receiving application.) When the indicator indicates "Process Now=No", then the received document content is cached at Block 260. (The content may then be processed upon a command from the PLU, which sends a "Process by Name" structured field as described below.) On the other hand, when the indicator indicates "Process Now= Yes", then the document content is immediately processed at Block 255.

As described above, the embedded document content to be processed at Block 210 of FIG. 2 may be of a number of different content types. FIG. 3A illustrates a table format that associates a given content type with an identifier and a specific content processor appropriate to that content type. (While a tabular format is depicted in FIG. 3A, other techniques for representing the information depicted therein may be used without deviating from the inventive concepts of the present invention, such as hard-coding the associated information into the logic of an implementation. In addition, support for such information may be omitted if an implementation of the present invention is used with only a single document content type.) Column 350 specifies several example of content types. Column 355 indicates an associated identifier for each specific content type, where the value of this identifier is to be agreed upon between document sending applications and document receiving applications and will be placed in 3270 data stream structured fields if an implementation of the present invention supports multiple document types. Column 360 indicates the type of content processor appropriate to each identified content type. Specific content types are listed as examples in rows 365, 370 and 375. For example, the Column-355 identifier corresponding to XML documents signifies that this type of data content should be passed to an XML processor (e.g. a style sheet processor or parser). The Column-355 identifier corresponding to a MathML document signifies that this specific content type should be passed to a MathML processor. A Column-355 identifier signifying a WBXML document indicates that this content should be passed to a WBXML processor. It will be apparent to those skilled in the art that a particular implementation of the present invention may support more content types, or fewer content types, than shown in the example of FIG. 3A. What is required is that the parties communicating agree in advance on the information conveyed by the associations such as depicted in FIG. 3A.

Figure 3B:
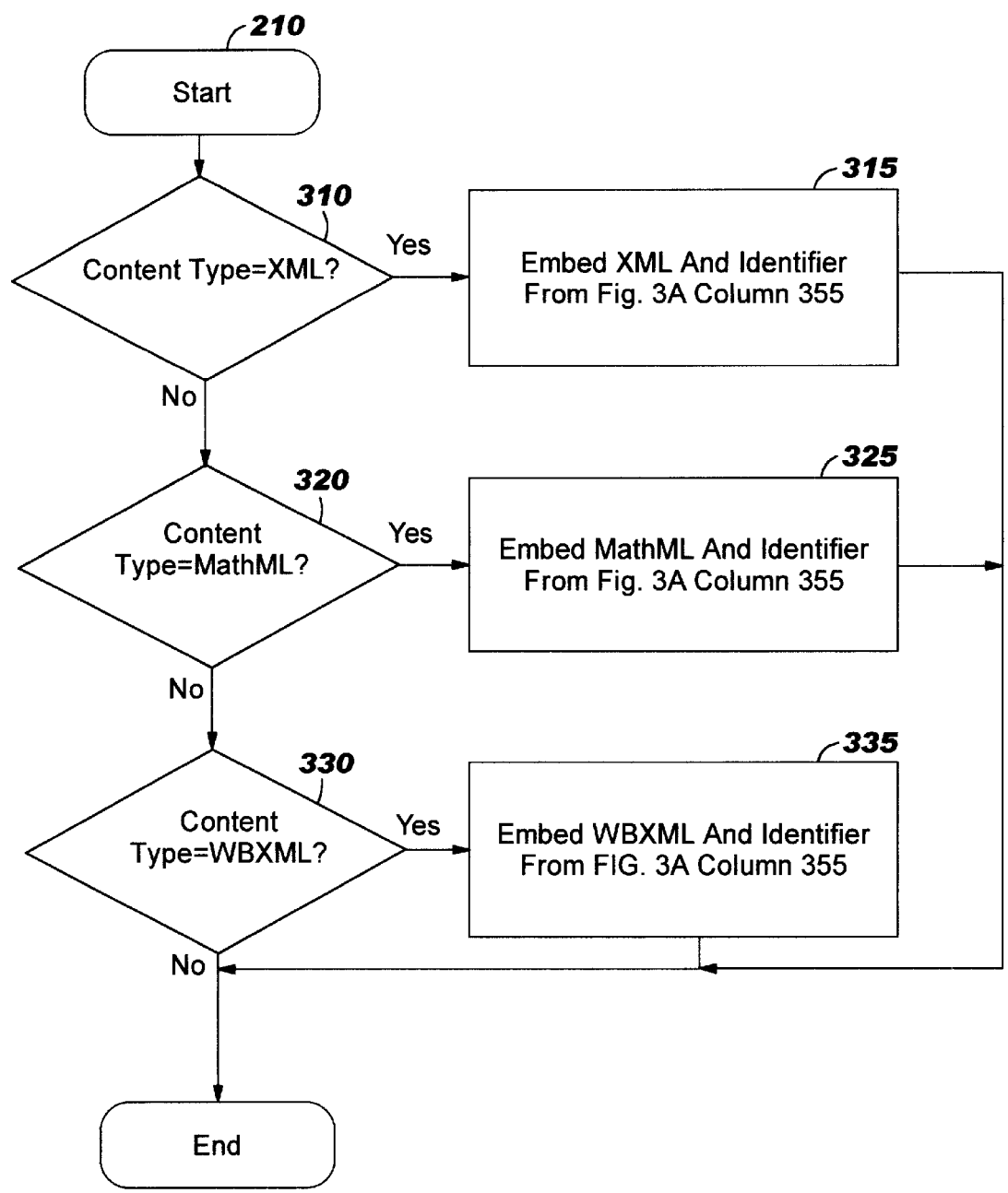
FIG. 3B is a flowchart illustrating operations for embedding structured document content in a 3270 data stream structured field, according to a preferred embodiment of the present invention.
Figure 4:
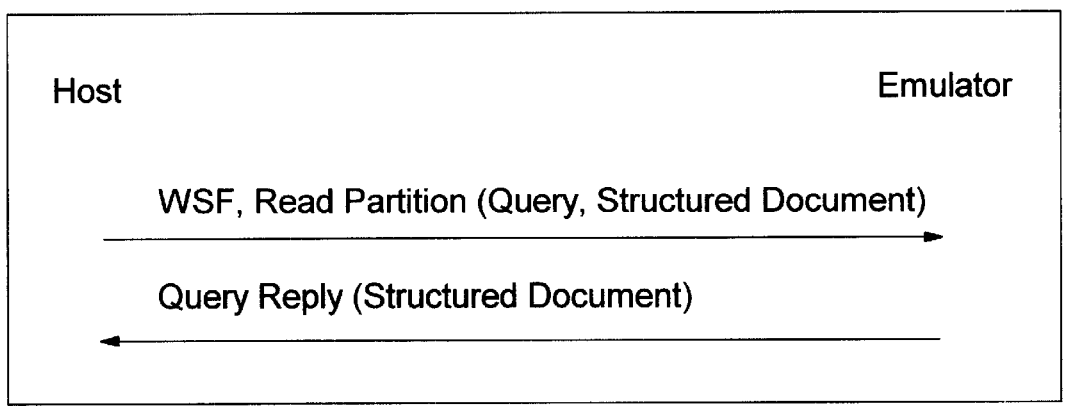
FIGS. 4–7 illustrate specific examples of 3270 data stream structured fields, including embedded structured document content, that are passed between a primary logical unit and a secondary logical unit, according to a preferred embodiment of the present invention.
Figure 5:
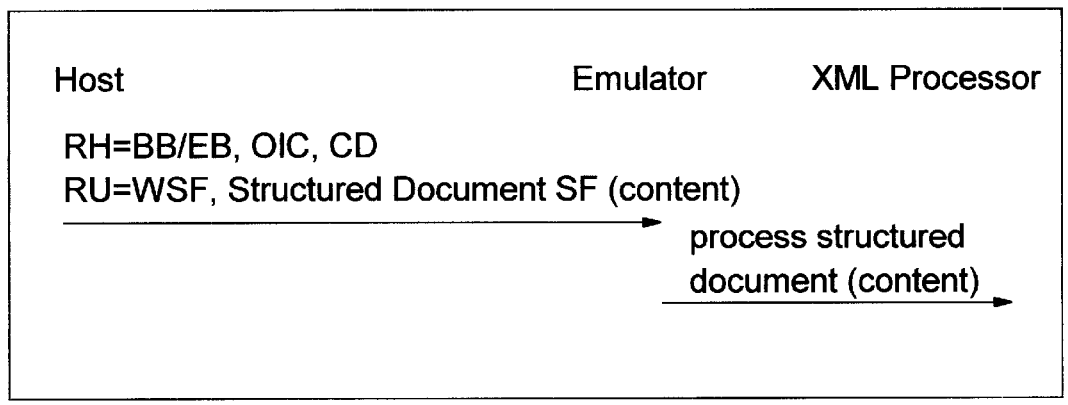

FIG. 3B illustrates operations for embedding multiple structured document types, including an identifier of the particular content type, in a 3270 data stream structured field. In an implementation of the present invention which supports only a single document type, the logic of FIG. 3B may be omitted. The processing of FIG. 3B begins at Block 310, which checks to see if the content to be embedded is XML content. If so, then the XML content and its associated content type identifier (see the description of FIG. 3A, above) are embedded by Block 315. If a MathML document is to embedded, then Block 320 has a positive result and the MathML content and associated identifier are embedded by Block 325. If WBXML content is to be embedded, then Block 330 has a positive result, and the WBXML content and associated identifier are embedded by Block 335. Examples of these identifiers are provided below. As will be obvious to one of skill in the art, the logic of FIG. 3B may be altered to reflect the content types supported by a particular implementation of the present invention, and more or fewer than three such types may be supported. Note further that while the logic of FIG. 3B is shown as processing each supported type individually, it will be obvious to one of skill in the art that alternative logic may be used which iteratively accesses the information stored in a structure such as the table depicted in columns 350 and 355 of FIG. 3A to locate a matching content type and retrieve its associated content type indicator.

A specific implementation of embedding structured document content in a 3270 data stream using structured fields will now be described. As is well known to those having skill in the art, Structured Fields (SF) are the predecessors of the General Data Stream used in SNA peer protocols (LU 6.2, APPN). A structured field generally has a 15-bit length field, a 1- or 2-byte Structured Field Identifier (SFID), two bytes of flags, and context-dependent parameters and/or data. An SF may contain additional variable length fields encoded in Length-Type format with a 1-byte length, 1-byte identifier, and context-dependent data. Specific SFs are defined for outbound or inbound use, or both. Structured Fields are described in detail in Chapters 4 and 5 of the above-cited IBM Reference GA23-0059-07.

The structured fields protocol is functionally rich due to a long history of incremental enhancement. According to this protocol, early in the session (before using any structured fields), the host sends a WSF command with the only or last SF being Read Partition (Query/Query List, SFID X'01') to determine what structured fields the client supports. This query may request that the client report all supported SFIDs (in the case of "Query"), or only the specific subset listed in bytes 6 through "n" (in the case of "Query List"). Either form may be used with the present invention. For ease of reference, "Query" will be used hereinafter to refer to both. The client may reject the Read Partition (Query) under certain circumstances described in the IBM reference; otherwise, it replies. The reply may include one or more specific Query Reply SFs, and/or a Query Reply (Summary) that lists all supported SFIDs. Hereinafter, "Query Reply" is used for case of reference to refer to either format. A specific embodiment of using this technique for an initialization protocol to be used with the present invention is illustrated in FIG. 8.

As described in connection with FIG. 2 at Block 210 and in connection with FIG. 3B, structured document content is embedded in 3270 data stream structured fields. Embedding of a structured document in a structured field will now be described in more detail.

A "Structured Document" structured field, hereinafter referred to as a "Structured Document SF", is defined according to the present invention. This Structured Document SF is used to transmit a structured document (or a segment thereof, if spanning is used) from the host to a client. Each structured document in a single transmission is in its own Structured Document SF. If multiple documents are to be transmitted in a single transmission, then separate Structured Document structured fields are used for each document. According to the preferred embodiment of the present invention, the format of the Structured Document SF is:

| Byte | Bit | Content |
| --- | --- | --- |
| 0–1 | | Length of structured field, including this length field (maximum value X'7FFF') |
| 2–3 | | Identifier = X'C100' |
| 4–5 | | Flags |
| | 0–1 | Group |
| | | 00   Continue |
| | | 01   End |
| | | 10   Begin |
| | | 11   Only |
| | 2 | Process Now indicator |
| | | 0 = Do not process now |
| | | 1 = Process now |
| 6 | | Structured document content type |
| 7-m | | Structured document content |

As described above in connection with Blocks 215, 220, and 225, initialization may proceed by sending a Read Partition (Query) structured field from the PLU to the SLU to query whether the secondary logical unit supports structured document content. The initialization protocol is described in FIG. 4, where the PLU is referred to as a Host and the SLU is referred to as an Emulator.

The existing Read Partition (Query) SF is modified according to the present invention to allow a host to explicitly query a 3270 client for structured document content support using the query code X'D0'. The following description only shows the fields of Read Partition (Query) that relate to structured document content. Fields not shown are unchanged.

| Byte | Bit | Content |
| --- | --- | --- |
| 0–1 | | Length of structured field, including this length field |
| 2 | | SFID = X'01' Read Partition |
| 3 | | Partition ID |
| | | X'FF' Query operations |
| 4 | | Type |
| | | X'02' Query (all) |
| | | X'03' Query List |

-continued

| Byte | Bit | Content |
| --- | --- | --- |
| 5 | 0–1 | Request type |
| | | 00   QCODE List (used when byte 4 indicates Query List) |
| | | 10   All (used when byte 4 indicates Query All) |
| | 2–7 | Reserved (zeroes) |
| 6-n | | QCODE |
| | | Lists the Query Reply codes requested, when the Type (byte 4) indicates Query List; otherwise, the Read Partition (Query) length is 6 bytes and this field is absent. X'D0' structured document content support. May also list other QCODEs to query whether the corresponding function is supported by the emulator. |

The existing Query Reply SF, with which a client responds to a Read Partition (Query), is modified according to the present invention so that a 3270 client may indicate its support for all the Structured Document structured fields:

| Byte | Bit | Content |
| --- | --- | --- |
| 0–1 | | Length of structured field, including this length field |
| 2 | | SFID = X'81' Query Reply |
| 3 | | QCODE |
| | | X'D0' structured document content support (client only) |
| | | X'D1' structured document content support (client and middle-tier server) |
| | | X'D2' structured document content support (middle-tier server only) |

Accordingly, the host sends Read Partition (Query) with the QCODE set to "structured document content", or Read Partition (Query List) with a QCODE of "structured document content" in the query code list. An emulator receiving one of these flows can assume that the host supports structured document content, and it replies by sending Query Reply (structured document content). It will be understood that the "structured document content" QCODE may be construed to indicate support for multiple document content types by prior agreement of the parties. Alternatively, an implementation may choose to define specific query codes for each particular document content type supported, where multiple such codes may then be sent in a Read Partition (Query) and multiple reply indicators may be returned in a Query Response (Summary), not shown, or in multiple Query Response structured fields. Support for using this alternative approach must be agreed upon by both parties in advance.

As also described above, after a Query Reply structured field is sent by the client, and received by the host, at Block 225 of FIG. 2, 3270 data stream structured fields including structured document content are passed at Block 235 or 245 (depending on whether spanning is required). According to the present invention, a host application may push structured document content to the client unsolicited, or may wait for the client to request a particular structured document. Upon receiving a structured document, the client first waits for the end of a spanned transmission, to ensure that it has received the entire document content. It then reassembles the segments of the document, if spanned, and (if the "Process Now" indicator is set to on or "Yes") passes the document content to the appropriate content processor (such as an XML parser).

Figure 6:
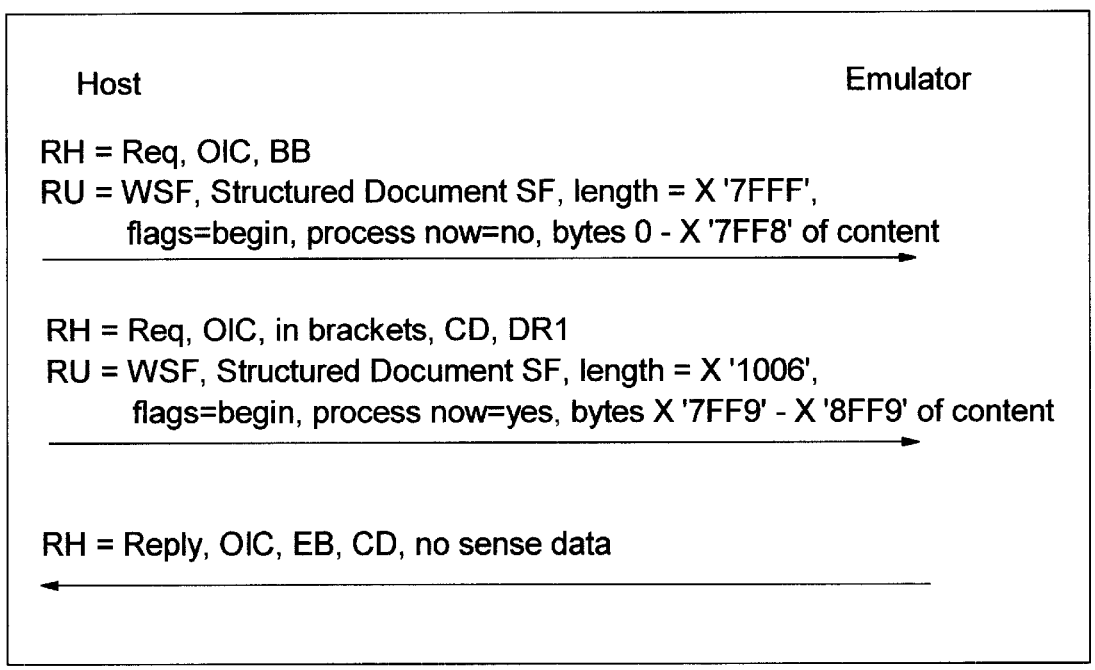
Figure 7:
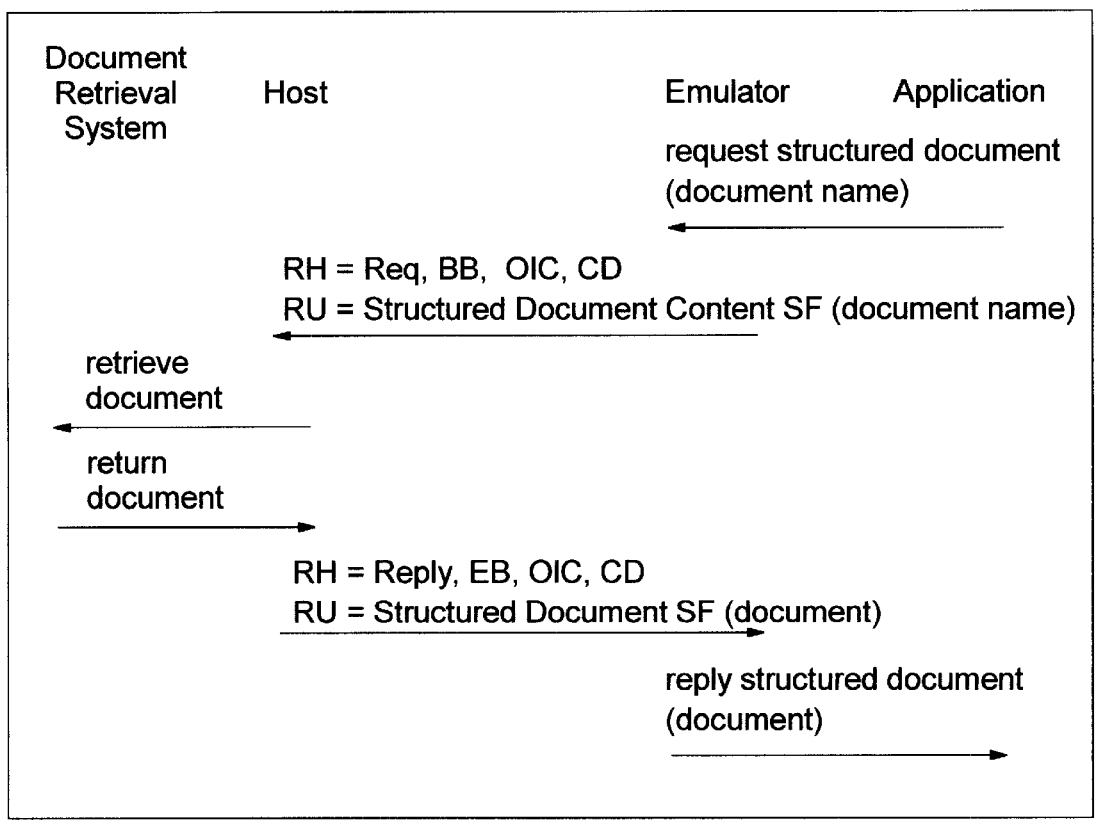

As described in Blocks 230, 240, and 245, structured document content may be longer than the outbound data length for which 3270 was originally designed and optimized. According to the present invention, an existing 3270 facility referred to as "spanning" is used to send a large piece of data in chunks. FIG. 6 illustrates spanning of multiple 3270 data stream structured fields. A specific embodiment of spanning will be illustrated in FIGS. 9 and 11.

Figure 10:
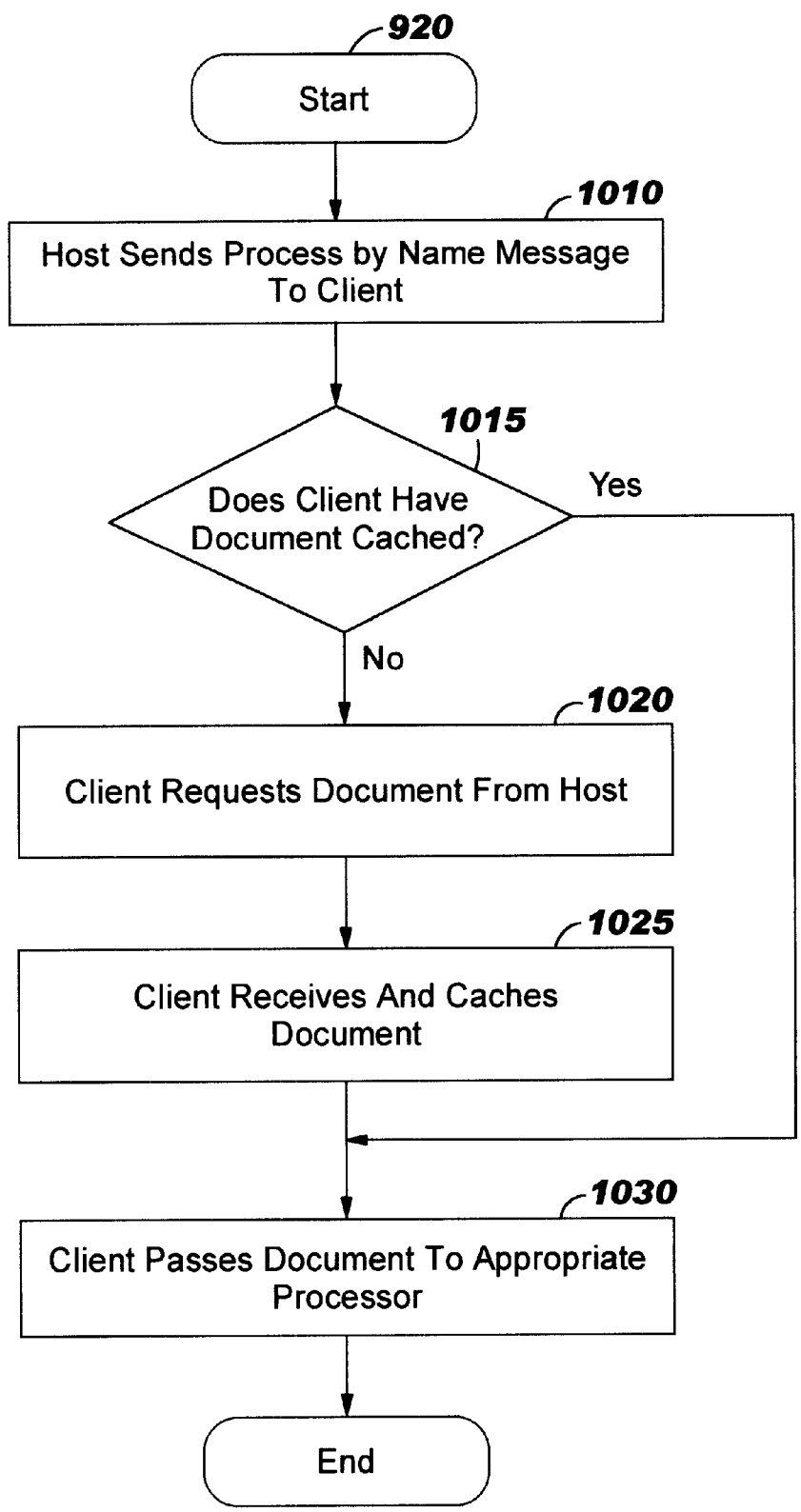
FIG. 10 illustrates a protocol that may be used by a host to explicitly instruct a client to process a specific structured document, according to a preferred embodiment of the present invention.

As previously stated, in a typical 3270 application, there are generally long pauses between data inputs by the user during which data transmission is idle. The present invention can take advantage of those pauses by interleaving spanned chunks of structured documents with other transmissions on the session, such as character-formatted data sent by the legacy application. The Structured Document structured fields may optionally include a "Process Now" indicator that can be turned on or off. This allows a well-designed application to start sending structured document content in anticipation of the data being needed. Using this indicator, the sender is able to take advantage of lulls in the transmission to send structured documents in chunks while still being able to notify the receiver if (and when) it has received a document that is complete and processable (for example, by a document renderer). (Otherwise, a processor such as a parser is likely to generate an error condition if it begins processing a structured document which has been only partially received.) See FIG. 6. When the complete document has been transmitted, and thus can be safely processed, another SF is sent referencing the previously-sent document by name, with the "Process Now" indicator turned on. FIG. 10 illustrates a specific embodiment of this aspect of the invention. According to the preferred embodiment of the present invention, the format of this Process by Name SF is:

| Byte | Bit | Content |
|---|---|---|
| 0–1 | | Length of structured field, including this length field (maximum value X'7FFF') |
| 2–3 | | Identifier = X'C101' |
| 4–5 | | Flags |
| | 0–1 | Group |
| | | 00  Continue |
| | | 01  End |
| | | 10  Begin |
| | | 11  Only |
| | 2 | Process Now indicator |
| | | 0 = Do not process |
| | | 1 = Process now (This setting is used) |
| 6-m | | Structured document identifier |

A client may request a structured document, as needed by a particular application. The client uses a Structured Document Content Request SF for this purpose. The reply is a Structured Document Content SF (or multiple such structured fields, if the document content is spanned) sent from the host, which the client passes to the appropriate content processor when reception is complete. See FIG. 9. The following describes the format of the SF sent from the client to the host to request a structured document, according to the preferred embodiment of the present invention.

| Byte | Bit | Content |
|---|---|---|
| 0–1 | | Length of structured field, including this length field (maximum value X'7FFF') |
| 2–3 | | Identifier = X'C102' |
| 4–5 | | Flags |
| | 0–1 | Group |

-continued

| Byte | Bit | Content |
|---|---|---|
| | | 00  Continue |
| | | 01  End |
| | | 10  Begin |
| | | 11  Only |
| | 2–15 | Reserved |
| 6 | | Structured document content type |
| 7-n | | Structured document identification |

The following SF may be sent by either the host or the client to indicate that it did not understand or could not perform a function requested by one of these Structured Document or Structured Document Content Request SFs.

| Byte | Bit | Content |
|---|---|---|
| 0–1 | | Length of structured field; including this length field (maximum value X'7FFF') |
| 2–3 | | Identifier = X'C103' |
| 4–5 | | Flags |
| | 0–1 | Group |
| | | 00  Continue |
| | | 01  End |
| | | 10  Begin |
| | | 11  Only |
| | 2–15 | Reserved |
| 6-n | | Exception data |

FIG. 8 illustrates an initialization procedure that is performed by the host at least once (exactly once in a preferred embodiment) per client per session, and which was previously described with reference to Blocks 215, 220, and 225 of FIG. 2. The host performs the procedure, which begins at Block 805, either immediately after session establishment, or preceding the first time the host wishes to send structured document content to a specific client. In Block 810, the host sends a conventional 3270 data stream Read Partition (Query) with a QCODE "Structured Document Content" to determine if the client, and any middle-tier server that may be present on the path between the host and the client, supports structured document content that may be integrated in the 3270 data stream according to the present invention. In Block 815, a client replies using a conventional 3270 data stream Query Reply with a new "Structured Document Content" QCODE parameter indicating that it does support structured document content.

Block 820 indicates that Block 825 is performed conditionally only when there is a middle-tier server present along the path between the client and the host that supports structured document content in accordance with the present invention. If so, at Block 825, the middle-tier server modifies the Query Reply built by the client in Block 815 to indicate the middle-tier server's support for structured document content, in addition to that indicated by the client. This indication is cumulative so the host can determine from the reply whether only the client, only the middle-tier server, or both the client and middle-tier server support the features of the present invention. In Block 830, the host receives the Query Reply sent by the client and possibly modified by a middle-tier server. The host stores information on the structured document capabilities of the specific client queried and the path to the client. The information is later tested in FIG. 9, Block 910, as will be described subsequently.

FIG. 9 illustrates detailed operations of a spanning technique whereby a host sends structured document content to a client within a 3270 data stream, and which was previously described with reference to Blocks 240 and 245 of FIG. 2. Operations start at Block 905. In Block 910, the host tests stored information as to the client's structured document capabilities (including any middle tier server in the path to the client), obtained by means of the initialization procedure illustrated in FIG. 8 and stored by Block 830 therein. If structured document content is not supported, the host performs Block 915: it treats the client as a conventional 3270 data stream client and sends it a standard 3270 data stream, excluding any integrated structured document content as defined by the present invention. However, if in Block 910 the stored data indicates that the specific client and the path to the client does support structured document content, the host proceeds to Block 920 where it builds and sends to the client a 3270 data stream structured field in accordance with the present invention. According to the present invention, a Process by Name SF is sent that instructs the client to request a certain named, typed document by reference, rather than sending the entire document at this time. This is an optional optimization technique aimed at reducing network traffic: if the client already has this document cached, then the client will use the cached version rather than requesting the host to deliver the document. Block 920 will be explained in more detail below with reference to FIG. 10.

In Block 925, if no request is received by the host from the client for the document referenced in Block 920, operations of FIG. 9 end. Otherwise, the host delivers the specified document to the client, as shown by Blocks 930 through 950.

In Block 930, the host tests the length of the document content that is to be delivered to the client. If the document's length exceeds the length allowable in a 3270 data stream structured field, the host performs the "spanning" procedure which is well known to those of skill in the art, as illustrated by Blocks 935, 940, and 950. In the first step of spanning as shown at Block 935, the host breaks the structured document content into chunks of a size suitable to fit within the length constraints of a 3270 SF. In Block 940, the host encodes a chunk to be sent in 3270 data stream structured fields and sends it to the client. Block 950 tests to determine if any more chunks remain to be sent. If so, the spanning operation loops back and repeats Blocks 940 and 950.

If in Block 930 the document could fit into a single 3270 data stream structured field, then in Block 945 the host encodes the document in a single 3270 data stream structured field and sends it to the client without spanning, whereupon the operations of FIG. 9 end.

FIG. 10 illustrates operations between a host and a client wherein the host need not always send to the client the entire structured document, and has instead sent (see Block 920 of FIG. 9) a Process by Name SF to the client. As stated previously, this message instructs the client to examine the client's cache for the desired document, identified by name and type, and to use this locally-accessible version of the document if present. Otherwise, when the client determines that the desired document is not cached, the client can then request the host to deliver the document to the client (by sending a Structured Document Content SF).

Figure 11B:
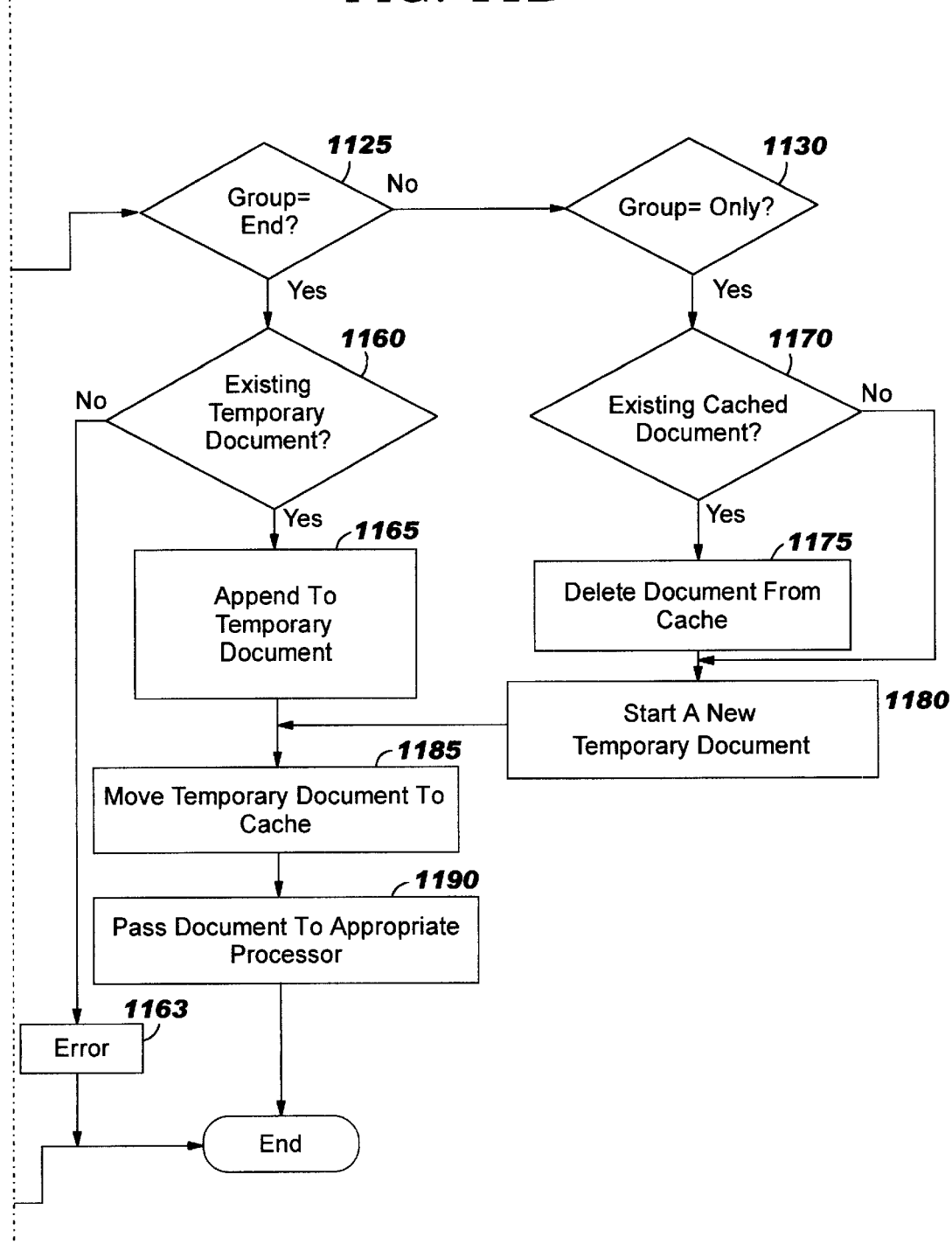

In Block 1010, the host builds and sends to the client a 3270 data stream structured field message instructing the client to process a particular named, typed document. In Block 1015, the client determines whether it already has the document (e.g. stored in its local cache). If so, the client next executes Block 1030, to be described subsequently. If not, the client executes Blocks 1020 and 1025. To request a named, typed document from the host, in Block 1020 the client builds and sends to the host a 3270 data stream Structured Document Content structured field message requesting the specific document from the host. In Block 1025, the client receives and caches the document so requested. FIG. 11 will provide a detailed illustration of detailed operations for Block 1025 in FIG. 10.

In Block 1030, the client passes the document referenced in Block 1010, whether already present in cache or obtained by request to the host, to the content processor appropriate for the specific document type (as determined, e.g., by the information depicted in FIG. 3A). For example, if the document type is "XML", the client may pass the document to a style sheet processor or to an XML parser. If the document type is "WBXML", the client passes the document to a processor appropriate for this content type, and so forth. As will be obvious to one of skill in the art, other document types not specifically discussed herein can be integrated within a 3270 data stream and routed, upon receipt, to an appropriate processor using the mechanism defined by this invention, so long as the client and host agree in advance on conventions associating each given document type with the appropriate content processor.

FIG. 11 illustrates operations at a client in receiving and caching documents that may be spanned. FIG. 11 corresponds to Block 1025 of FIG. 10. In Block 1110, the client receives a 3270 data stream structured field containing a named document of an identified type. Such receipt may occur either as a result of the host pushing structured documents to the client unsolicited, or as a result of the host delivering a document to the client upon the client's request, following the "Process by Name" SF message shown in Block 1010.

In Blocks 1115 through 1130 the client tests the 2-bit "group" field in the 3270 data stream structured field to determine if this field indicates the beginning of a spanned document, the continuation of a spanned document previously begun, the end of the spanned document previously begun, or a non-spanned document, respectively. If the Block 1115 test indicates "begin", the client performs the test in Block 1135 to check if the named, typed document is already in its cache. If so, it performs Block 1140 and deletes the document from its cache in order to replace this cached version with the newer version being received. Otherwise, when the document is not already cached, Block 1140 is skipped. Block 1145 then stores the first piece of the received document into a named temporary storage location.

If the Block 1120 test indicates that the structured field is a continuation of a spanned document, the client performs the Block 1150 test to find the temporary storage location for the continued document. If not found, an error has occurred as indicated by Block 1153 and the client discards the incomplete or erroneous structured field data. Otherwise, in Block 1155 the client appends the new document content to the temporary storage location.

If the Block 1125 test indicates that the data is the last piece of a spanned document, the client checks for the existence of the temporary storage location in which it has been assembling the pieces of the spanned document. If the Block 1160 test is false, an error has occurred and Block 1163 indicates that the client discards the erroneous structured field data. Otherwise, in Block 1165 the client appends the document content in the structured field to the temporary logic storage location. In Block 1185, now that the complete document has been received, the client moves the temporary document into the cache where it may be referenced by future Block 1010 "Process by Name" procedures. Finally, in Block 1190, the client passes the document to the appropriate content processor, for handling as will be described subsequently in FIG. 12. If the Block 1130 test indicates that the data is not spanned (i.e. "Group=only" is true), the client performs the Block 1170 test and if the document is in cache, in Block 1175 it deletes the document from its cache in favor of the newly-received version. Otherwise, Block 1175 is skipped. The client then copies the non-spanned document into a temporary storage location in Block 1180. It then executes the previously-mentioned logic of Blocks 1185 and 1190.

Figure 12:
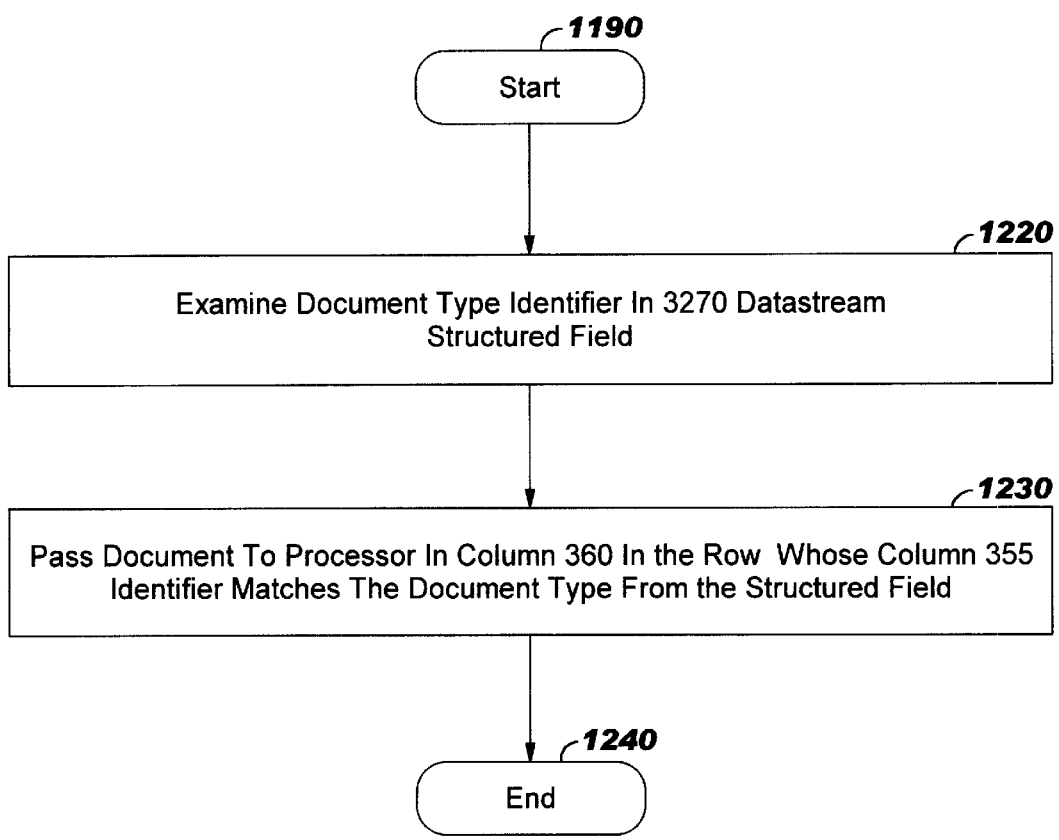
FIG. 12 illustrates the client's routing of a structured document to a corresponding document processor, according to a preferred embodiment of the present invention.

FIG. 12 illustrates a client's operations upon receiving a complete document when the processing of the document is not inhibited. FIG. 12 corresponds to Block 1190 of FIG. 11 and refers to the table of FIG. 3A. In Block 1220, the client examines the document-type identifier in the 3270 data stream structured field by comparing it with the entries in each row of column 355 in the table of FIG. 3A. In Block 1230, when the client finds a Column-355 identifier matching that in the received 3270 data stream structured field, the client passes the document to the specific content processor listed in column 360 of the same row of the table. Thus, if the client receives an XML document, the example table of FIG. 3A directs the client to pass the document to an XML processor (such as a style sheet processor or a parser), in response to a "Process by Name" message or an unsolicited document delivery with the "Process Now" indicator from the host.

Many new capabilities may be provided by integrating structured document content with legacy 3270 applications in the manner which has been described. For example, a host application that retrieves data from a data repository and delivers the data to the client can now access repositories (such as LDAP directories, which are directories commonly accessed using a particular protocol, or other directories) containing more modem structured data formats, and deliver the data retrieved therefrom without requiring some type of transformation into a more conventional 3270 format. Or, a middle tier server might use the present invention to integrate structured document content into a 3270 data stream that it is forwarding to a client. Using the present invention, the modem structured document content can be added to existing applications and forwarded within existing transport mechanisms without a requirement to rewrite the application or to rewrite the infrastructure.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A system for passing structured document content between a first structured document application at a primary logical unit and a second structured document application at a secondary logical unit that communicate with each other over a network using 3270 data stream architecture, the system comprising:

means for embedding structured document content in a 3270 data stream structured field; and means for passing the 3270 data stream structured field including the structured document content so embedded between the first structured document application at the primary logical unit and the second structured document application at the secondary logical unit, using a 3270 communications session over the network.

2. The system according to claim 1, further comprising:

means for determining whether the secondary logical unit supports structured document content;

the passing means being responsive to the determining means, to pass the 3270 data stream structured field including the structured document content so embedded, if the secondary logical unit supports structured document content.

3. The system according to claim 2, wherein the primary logical unit and the secondary logical unit communicate with each other via a middle tier server, the system farther comprising:

means for determining if the middle tier server supports structured document content;

the passing means being responsive to the determining means, to pass the 3270 data stream structured field including the structured document content so embedded, if the secondary logical unit and the middle tier server both support structured document content.

4. The system according to claim 2, wherein the determining means comprises:

means for sending a Read Partition (Query) structured field from the primary logical unit to the secondary logical unit, to query whether the secondary logical unit supports structured document content; and means for sending a Query Reply structured field from the secondary logical unit to the primary logical unit in response to receipt of the Read Partition (Query) from the primary logical unit, if the secondary logical unit supports structured document content;

the passing means being responsive to receipt of the Query Reply structured field from the secondary logical unit.

5. The system according to claim 1, wherein the means for embedding structured document content in a 3270 data stream structured field comprises:

means for embedding a structured document and a structured document identifier in a 3270 data stream structured field.

6. The system according to claim 1:

wherein the means for embedding comprises means for embedding structured document content of a size that exceeds a structured field length limit into a plurality of 3270 data stream structured fields; and wherein the means for passing comprises means for spanning the plurality of 3270 data stream structured fields between the primary logical unit and the secondary logical unit.

7. The system according to claim 6, further comprising:

means for caching the plurality of 3270 data stream structured fields in the secondary logical unit to thereby reduce latency.

8. The system according to claim 7, wherein the means for spanning comprises means for spanning the plurality of 3270 data stream structured fields including an indicator that inhibits processing of the structured document content between the primary logical unit and the secondary logical unit.

9. The system according to claim 7, further comprising:

means for processing the structured document content by reference;

means for testing whether the structured document content that is processed by reference is cached in the secondary logical unit; and means for requesting the structured document content from the primary logical unit if the structured document content that is processed by reference is not cached in the secondary logical unit.

10. A system for passing structured document content from a first structured document application at a primary logical unit to a second structured document application at a secondary logical unit that communicate with each other over a network using 3270 data stream architecture, the system comprising:

means for embedding structured document content in a 3270 data stream structured field; and means for pushing the 3270 data stream structured field including structured document content so embedded, from the first structured document application at the primary logical unit to the second structured document application at the secondary logical unit under control of the primary logical unit, without receiving a request for the structured document content from the second structured document application at the secondary logical unit, using a 3270 communications session over the network.

11. The system according to claim 10, further comprising:

means for determining whether the secondary logical unit supports structured document content;

the pushing means being responsive to the determining means, to pass the 3270 data stream structured field including the structured document content so embedded, if the secondary logical unit supports structured document content.

12. The system according to claim 11, wherein the primary logical unit and the secondary logical unit communicate with each other via a middle tier server, the system further comprising:

means for determining if the middle tier server supports structured document content;

the pushing means being responsive to the determining means, to push the 3270 data stream structured field including the structured document content so embedded, if the secondary logical unit and the middle tier server both support structured document content.

13. The system according to claim 11, wherein the determining means comprises:

means for sending a Read Partition (Query) structured field from the primary logical unit to the secondary logical unit, to query whether the secondary logical unit supports structured document content; and means for sending a Query Reply structured field from the secondary logical unit to the primary logical unit in response to receipt of the Read Partition (Query) from the primary logical unit, if the secondary logical unit supports structured document content;

the pushing means being responsive to receipt of the Query Reply structured field from the secondary logical unit.

14. The system according to claim 10, wherein the means for embedding structured document content in a 3270 data stream structured field comprises:

means for embedding a structured document and a structured document type identifier in a 3270 data stream structured field.

15. The system according to claim 10:

wherein the means for embedding comprises means for embedding structured document content of a size that exceeds a structured field length limit into a plurality of 3270 data stream structured fields; and wherein the means for pushing comprises means for spanning the plurality of 3270 data stream structured fields from the primary logical unit to the secondary logical unit.

16. A computer program product for passing structured document content between a first structured document application at a primary logical unit and a second structured document application at a secondary logical unit that communicate with each other over a network using 3270 data stream architecture, the computer program product embodied on a computer-readable medium and comprising:

computer-readable program code means for embedding structured document content in a 3270 data stream structured field; and computer-readable program code means for passing the 3270 data stream structured field including the structured document content so embedded between the first structured document application at the primary logical unit and the second structured document application at the secondary logical/unit, using a 3270 communications session over the network.

17. The computer program product according to claim 16, further comprising:

computer-readable program code means for determining whether the secondary logical unit supports structured document content;

the computer-readable program code means for passing being responsive to the computer-readable program code for determining, to pass the 3270 data stream structured field including the structured document content so embedded, if the secondary logical unit supports structured document content.

18. The computer program product according to claim 17, wherein the primary logical unit and the secondary logical unit communicate with each other via a middle tier server, the computer program product further comprising:

computer-readable program code means for determining if the middle tier server supports structured document content;

the computer-readable program code means for passing being responsive to the computer-readable program code for determining, to pass the 3270 data stream structured field including the structured document content so embedded, if the secondary logical unit and the middle tier server both support structured document content.

19. The computer program product according to claim 17, wherein the computer-readable program code means for determining comprises:

computer-readable program code means for sending a Read Partition (Query) structured field from the primary logical unit to the secondary logical unit, to query whether the secondary logical unit supports structured document content; and computer-readable program code means for sending a Query Reply structured field from the secondary logical unit to the primary logical unit in response to receipt of the Read Partition (Query) from the primary logical unit, if the secondary logical unit supports structured document content;

the computer-readable program code means for passing being responsive to receipt of the Query Reply structured field from the secondary logical unit.

20. The computer program product according to claim 16, wherein the computer-readable program code means for embedding structured document content in a 3270 data stream structured field comprises:

computer-readable program code means for embedding a structured document and a structured document identifier in a 3270 data stream structured field.

21. The computer program product according to claim 16:

wherein the computer-readable program code means for embedding comprises computer-readable program code means for embedding structured document content of a size that exceeds a structured field length limit into a plurality of 3270 data stream structured fields; and wherein the computer-readable program code means for passing comprises computer-readable program code means for spanning the plurality of 3270 data stream structured fields between the primary logical unit and the secondary logical unit.

22. The computer program product according to claim 21, further comprising:

computer-readable program code means for caching the plurality of 3270 data stream structured fields in the secondary logical unit to thereby reduce latency.

23. The computer program product according to claim 22, wherein the computer-readable program code means for spanning comprises computer-readable program code means for spanning the plurality of 3270 data stream structured fields including an indicator that inhibits processing of the structured document content between the primary logical unit and the secondary logical unit.

24. The computer program product according to claim 22, further comprising:

computer-readable program code means for processing the structured document content by reference;

computer-readable program code means for testing whether the structured document content that is processed by reference is cached in the secondary logical unit; and computer-readable program code means for requesting the structured document content from the primary logical unit if the structured document content that is processed by reference is not cached in the secondary logical unit.

25. A computer program product for passing structured document content from a first structured document application at a primary logical unit to a second structured document application at a secondary logical unit that communicate with each other over a network using 3270 data stream architecture, the computer program product embodied on a computer-readable medium and comprising:

computer-readable program code means for embedding structured document content in a 3270 data stream structured field; and computer-readable program code means for pushing the 3270 data stream structured field including structured document content so embedded, from the first structured document application at the primary logical unit to the second structured document application at the secondary logical unit under control of the primary logical unit, without receiving a request for the structured document content from the second structured document application at the secondary logical unit, using a 3270 communications session over the network.

26. The computer program product according to claim 25, further comprising:

computer-readable program code means for determining whether the secondary logical unit supports structured document content;

the computer-readable program code means for pushing being responsive to the computer-readable program code means for determining, to pass the 3270 data stream structured field including the structured document content so embedded, if the secondary logical unit supports structured document content.

27. The computer program product according to claim 26, wherein the primary logical unit and the secondary logical unit communicate with each other via a middle tier server, the computer program product further comprising:

computer-readable program code means for determining if the middle tier server supports structured document content;

the computer-readable program code means for pushing being responsive to the computer-readable program code means for determining, to push the 3270 data stream structured field including the structured document content so embedded, if the secondary logical unit and the middle tier server both support structured document content.

28. The computer program product according to claim 26, wherein the computer-readable program code means for determining comprises:

computer-readable program code means for sending a Read Partition (Query) structured field from the primary logical unit to the secondary logical unit, to query whether the secondary logical unit supports structured document content; and computer-readable program code means for sending a Query Reply structured field from the secondary logical unit to the primary logical unit in response to receipt of the Read Partition (Query) from the primary logical unit, if the secondary logical unit supports structured document content;

the computer-readable program code means for pushing being responsive to receipt of the Query Reply structured field from the secondary logical unit.

29. The computer program product according to claim 25, wherein the computer-readable program code means for embedding structured document content in a 3270 data stream structured field comprises:

computer-readable program code means for embedding a structured document and a structured document type identifier in a 3270 data stream structured field.

30. The computer program product according to claim 25:

wherein the computer-readable program code means for embedding comprises computer-readable program code means for embedding structured document content of a size that exceeds a structured field length limit into a plurality of 3270 data stream structured fields; and wherein the computer-readable program code means for pushing comprises computer-readable program code means for spanning the plurality of 3270 data stream structured fields from the primary logical unit to the secondary logical unit.

31. A method for passing structured document content between a first structured document application at a primary logical unit and a second structured document application at a secondary logical unit that communicate with each other over a network using 3270 data stream architecture, the method comprising the steps of:

embedding structured document content in a 3270 data stream structured field; and passing the 3270 data stream structured field including the structured document content so embedded between the first structured document application at the primary logical unit and the second structured document application at the secondary logical unit, using a 3270 communications session over the network.

32. The method according to claim 31, further comprising the step of:

determining whether the secondary logical unit supports structured document content;

the passing step being responsive to the determining step, to pass the 3270 data stream structured field including the structured document content so embedded, if the secondary logical unit supports structured document content.

33. The method according to claim 32, wherein the primary logical unit and the secondary logical unit communicate with each other via a middle tier server, the method further comprising the step of:

determining if the middle tier server supports structured document content;

the passing step being responsive to the determining step, to pass the 3270 data stream structured field including the structured document content so embedded, if the secondary logical unit and the middle tier server both support structured document content.

34. The method according to claim 32, wherein the determining step comprises the steps of:

a Read Partition (Query) structured field from the primary logical unit to the secondary logical unit, to query whether the secondary logical unit supports structured document content; and sending a Query Reply structured field from the secondary logical unit to the primary logical unit in response to receipt of the Read Partition (Query) from the primary logical unit, if the secondary logical unit supports structured document content;

the passing step being responsive to receipt of the Query Reply structured field from the secondary logical unit.

35. The method according to claim 31, wherein the step of embedding structured document content in a 3270 data stream structured field comprises the step of:

embedding a structured document and a structured document identifier in a 3270 data stream structured field.

36. The method according to claim 31:

wherein the step of embedding comprises embedding structured document content of a size that exceeds a structured field length limit into a plurality of 3270 data stream structured fields; and wherein the step of passing comprises spanning the plurality of 3270 data stream structured fields between the primary logical unit and the secondary logical unit.

37. The method according to claim 36, further comprising the step of:

caching the plurality of 3270 data stream structured fields in the secondary logical unit to thereby reduce latency.

38. The method according to claim 37, wherein the spanning step comprises spanning the plurality of 3270 data stream structured fields including an indicator that inhibits processing of the structured document content between the primary logical unit and the secondary logical unit.

39. The method according to claim 37, further comprising the steps of:

processing the structured document content by reference;

testing whether the structured document content that is processed by reference is cached in the secondary logical unit; and requesting the structured document content from the primary logical unit if the structured document content that is processed by reference is not cached in the secondary logical unit.

40. A method for passing structured document content from a first structured document application at a primary logical unit to a second structured document application at a secondary logical unit that communicate with each other over a network using 3270 data stream architecture, the method comprising the steps of:

embedding structured document content in a 3270 data stream structured field; and pushing the 3270 data stream structured field including structured document content so embedded, from the first structured document application at the primary logical unit to the second structured document application at the secondary logical unit under control of the primary logical unit, without receiving a request for the structured document content from the second structured document application at the secondary logical unit, using a 3270 communications session over the network.

41. The method according to claim 40, further comprising the step of:

determining whether the secondary logical unit supports structured document content;

the pushing step being responsive to the determining step, to pass the 3270 data stream structured field including the structured document content so embedded, if the secondary logical unit supports structured document content.

42. The method according to claim 41, wherein the primary logical unit and the secondary logical unit communicate with each other via a middle tier server, the method further comprising the step of:

determining if the middle tier server supports structured document content;

the pushing step being responsive to the determining step, to push the 3270 data stream structured field including the structured document content so embedded, if the secondary logical unit and the middle tier server both support structured document content.

43. The method according to claim 41, wherein the determining step comprises the steps of:

sending a Read Partition (Query) structured field from the primary logical unit to the secondary logical unit, to query whether the secondary logical unit supports structured document content; and sending a Query Reply structured field from the secondary logical unit to the primary logical unit in response to receipt of the Read Partition (Query) from the primary logical unit, if the secondary logical unit supports structured document content;

the pushing step being responsive to receipt of the Query Reply structured field from the secondary logical unit.

44. The method according to claim 40, wherein the step of embedding structured document content in a 3270 data stream structured field comprises the step of:

embedding a structured document and a structured document type identifier in a 3270 data stream structured field.

45. The method according to claim 40:

wherein the embedding step comprises embedding structured document content of a size that exceeds a structured field length limit into a plurality of 3270 data stream structured fields; and wherein the pushing step comprises spanning the plurality of 3270 data stream structured fields from the primary logical unit to the secondary logical unit.

* * * * *